Patented Feb. 27, 1923.

1,446,637

UNITED STATES PATENT OFFICE.

FRANK G. BREYER, OF PALMERTON, AND CLAYTON W. FARBER, OF BOWMANSTOWN, PENNSYLVANIA, ASSIGNORS TO THE NEW JERSEY ZINC COMPANY, OF NEW YORK. N. Y., A CORPORATION OF NEW JERSEY.

MANUFACTURE OF LITHOPONE.

No Drawing.    Application filed November 2, 1921.    Serial No. 512,346.

*To all whom it may concern:*

Be it known that we, FRANK G. BREYER and CLAYTON W. FARBER, citizens of the United States, residing at Palmerton, county of Carbon, State of Pennsylvania, and Bowmanstown, county of Carbon, State of Pennsylvania, have invented certain new and useful Improvements in the Manufacture of Lithopone; and we do hereby declare the following to be a full, clear, and exact description of the invention, such as will enable others skilled in the art to which it appertains to make and use the same.

This invention relates to lithopone, and has for its object the provision of certain improvements in the manufacture of lithopone as well as the provision, as a new article of manufacture, of a lithopone possessing certain novel and improved properties.

Lithopone is a white pigment composed of zinc sulfide and barium sulfate and is extensively used in the paint industry. In manufacturing lithopone, solutions of barium sulfide and zinc sulfate are appropriately mixed and the resulting precipitate of zinc sulfide and barium sulfate is washed and dried. The precipitate of zinc sulfide and barium sulfate at this stage in the manufacture of lithopone is generally referred to as crude lithopone. Crude lithopone is not suitable for paint purposes, but when it is heated, for example, to dull redness, and suddenly cooled, by plunging into cold water, its characteristics are so modified as to adapt it for paint purposes.

Lithopone, as commonly used in the paint industry, is mixed with an appropriate vehicle such as oil or varnish. One of the most baffling set of facts that the paint technologist has to face is the great variation in consistency obtained when equal volumes of different pigments are incorporated in equal volumes of the same vehicle. But more baffling still to the paint technologist is the fact that often when equal volumes of different lots of lithopone are incorporated in equal volumes of the same vehicle mixtures are obtained which vary widely from one another in consistency. The consistency of a mixture of a pigment with an appropriate vehicle, such as oil or varnish, is dependent upon the ease with which the pigment is wet by the vehicle. As heretofore commercially manufactured, and marketed, different brands or lots of lithopone have been found in practice to differ widely in the ease with which the lithopone is wetted by a particular vehicle. The present day commercial brands of lithopone are difficultly wetted by many desirable oils and varnishes, or, as the paint mixer says, lithopone "fights" these vehicles during the mixing operation. On the other hand, where a lithopone is found which is wetted by the vehicle with reasonable ease, thickening or livering reactions of the resulting mixture are generally encountered.

The present invention contemplates an improvement in the manufacture of lithopone by which the ease with which the lithopone mixes with a vehicle such as oil or varnish and the consistency of the resulting mixture can be accurately controlled within satisfactory limits. The invention is based upon our discovery that the ease with which lithopone incorporates with or is wetted by a vehicle such as oil or varnish is largely proportional to the degree of alkalinity manifested by the lithopone. Lithopone as heretofore ordinarily made gives a neutral or slightly acid water solution. Such neutral or acid lithopone incorporates with or is wetted by many oils and varnishes with difficulty (as heretofore stated, the paint grinder commonly refers to this property as "fighting" the vehicle) and does not in consequence make as smooth and unctuous a paint as otherwise, especially with the higher grade more neutral oils. Such neutral or acid lithopones also occasion subsequent changes in the body or consistency of the paint (after the mixing operation). This is due to the further wetting of the lithopone which continues slowly (after the mixing).

While lithopone as heretofore ordinarily manufactured gives a neutral or slightly acid water solution, there are or have been on the market certain brands of lithopone which give a strongly alkaline water solution. This is particularly true of those lithopones in which such additive agents as magnesium oxide are incorporated in the lithopone with the view of improving the light resistance of the lithopone. Such strongly alkaline lithopones exhibit marked tendencies to liver and thicken on standing or ageing and are objectionable on this account.

So far as we are aware, the effects of acidity, neutrality and strong alkalinity on the mixing and grinding properties of lithopone have not heretofore been recognized, and our present invention is based upon our discoveries in this connection. Thus, we have accurately determined the degree of alkalinity in lithopone required to insure satisfactory wetting of the lithopone within the mixing and grinding time. In other words, as a result of our researches and investigations, we have determined the proper degree of alkalinity which lithopone should possess in order to satisfactorily mix with appropriate vehicles such as oils and varnishes and at the same time not be subject to any subsequent reaction with the vehicle resulting in livering, or yellowing of the vehicle when dried.

The lack of facts or guiding principles in so important a quality of lithopone up to within the last year or so is understandable in view of the fact that up to that time there was no clear conception of consistency or any accurate quantitative means of studying this most important property. The consistency of a pigment-vehicle suspension can now be accurately determined by an instrument known as the plastometer (see article by Bingham and Green, Proceedings A. S. T. M. 1919). Studies which we have made with the plastometer coupled with original microscopic investigations show that a major cause of variability in consistency in pigment-vehicles suspensions is the degree of flocculation. At the same time we have discovered that the degree of flocculation which (other things being equal) determines both the consistency of a pigment-vehicle suspension and the ease of incorporating or mixing of the pigment with the suspending medium or vehicle is dependent upon the degree of wetting of the pigment by the suspending medium or vehicle. And, as hereinbefore mentioned, we have moreover discovered, particularly with respect to lithopone, that the degree of wetting is a function of the alkaline or basic nature of the pigment.

The harmful after-effect of a highly basic or alkaline lithopone is well recognized in both the rubber and paint industry. We have discovered that there is a curve of increasing ease of incorporation of lithopone with a vehicle such as oil or varnish, corresponding to increase in the alkaline or basic nature of the lithopone. The region in the immediate neighborhood of where this curve (showing the increased ease of incorporation) crosses the curve showing the increased bad after-effects is the desired range of alkalinity for insuring the maximum ease of incorporation with the minimum bad after-effect.

The present invention accordingly involves imparting to the finished lithopone such a degree of alkalinity that the lithopone is satisfactorily wetted by an appropriate paint vehicle such as oil or varnish without being subject to such subsequent reactions with the vehicle as cause livering or thickening of the pigment-vehicle mixture. We have found the range of alkalinity of the lithopone necessary for the practice of the present invention to be relatively narrow. For the purposes of explanation and definition the range of alkalinity of the lithopone contemplated by the present invention is best determined and defined in the following manner.

A fifty (50) gram sample of the lithopone whose alkalinity is to be determined is placed in a four hundred (400) cubic centimeter beaker or other appropriate receptacle, with two hundred and fifty (250) cubic centimeters of distilled water and the mixture is thoroughly agitated for five (5) minutes. The temperature of the distilled water should be between 65° and 75° F., and when a comparison is made with a standard sample of ascertained and suitable alkalinity the temperature of the water in both samples should be the same. The mixture is then filtered and one hundred (100) cubic centimeters of the clear filtrate is titrated to a faint pink color with N/50 solution of sulfuric acid using methyl orange as an indicator. The desired range of alkalinity of lithopone contemplated by the present invention is such that when subjected to the foregoing described test between 2 and 4 cubic centimeters of the N/50 solution of sulfuric acid are required for the titration of the aforementioned clear filtrate to a faint pink color.

A lithopone, which when subjected to the hereinbefore described, precision alkalinity test, requires less than 2 cubic centimeters of N/50 sulfuric acid in titration, is difficultly wetted by or incorporated with paint vehicles. On the other hand, a lithopone, which when subjected to the hereinbefore described alkalinity test, requires more than about 4 cubic centimeters of N/50 sulfuric acid in titration, exhibits marked tendencies to liver or thicken on standing. In the commercial practice of our invention, we find that the most satisfactory results are secured by so controlling the alkalinity of the finished lithopone, as hereinafter more fully described, that, when subjected to the hereinbefore described precision alkalinity test, between 3 and 4 cubic centimeters of N/50 sulfuric acid are required in titration.

Alkalinity in finished lithopone may be produced in several ways. Our preferred practice, in carrying out the present invention, is to carry a slight excess of barium sulfide in the precipitating liquors, that is, in the mixed solutions of barium sulfide and zinc sulfate. This barium sulfide excess may be defined or expressed in terms of the cubic centimeters of a N/10 iodine solution used up in oxidizing 25 cubic centimeters of a filtrate obtained by filtering an appropriate sample of the crude pulp obtained from the precipitation tanks. The crude pulp, that is, the precipitating liquors containing in suspension the precipitated zinc sulfide and barium sulfate, should be agitated in a paddle-stirred precipitating tank with the barium sulfide excess for at least one hour before a test sample is considered final. Our preferred practice, in imparting to lithopone the degree of alkalinity contemplated by the present invention, is to carry sufficient barium sulfide excess in the precipitating liquors so that 25 cubic centimeters of the filtrate from the crude pulp will require between 1 and 2 cubic centimeters of N/10 iodine solution. It will, of course, be understood that this barium sulfide excess will vary up and down a little, if stronger or weaker solutions are used. The figures here given are for pulps precipitated from 20° Baumé zinc sulfate solution and 12° Baumé barium sulfide solution.

The crude lithopone precipitated in such an excess of barium sulfide as contemplated by our preferred practice is, after washing and filter-pressing, strongly alkaline to phenolphthalein. Care must be exercised in drying this crude lithopone in order to maintain the alkalinity, since otherwise the alkalinity is likely to disappear, probably due to oxidation of the barium sulfide. We have found that with the ordinary type of tunnel drier, in common use for drying crude lithopone, it is not safe to go much below an average of 6% moisture in the lithopone, since when the moisture content of the lithopone is reduced below this figure the degree of alkalinity becomes too weak or may vanish entirely. The lumps of crude lithopone when dried to only about 6% moisture show a pink when phenolphthalein is sprinkled on freshly exposed surfaces. In our preferred practice, the crude lithopone dried to the moisture content hereinbefore mentioned, is uniformly muffled in upright or vertical retorts through which the material passes by gravity, the retorts being properly proportioned to secure uniformity of heating and being constructed to exclude air or other oxidizing gases from the lithopone as it passes therethrough. This method of muffling lithopone is described and claimed in the patent of Frank G. Breyer and James A. Singmaster, No. 1,411,646, dated April 4, 1922. This method of muffling lithopone by progressively passing the same through an upright or vertical retort from which air is excluded is of special advantage in conjunction with our present preferred practice of imparting the desired degree of alkalinity to the finished lithopone by means of an excess of barium sulfide in the precipitating liquors, because by this method of muffling it is comparatively easy to retain during the muffling operation the desired degree of alkalinity. On the other hand, when the lithopone is muffled in the heretofore common types of horizontal muffles considerable difficulty is experienced in properly retaining the desired degree of alkalinity in the finished product solely by carrying an excess of barium sulfide in the original precipitating liquors.

When the alkalinity is produced by carrying an appropriate excess of barium sulfide in the precipitating liquors as hereinbefore described and the crude lithopone is muffled in upright or vertical retorts from which air is excluded as hereinbefore described, we find that the muffled lithopone is discharged from such retorts with such a degree of alkalinity that when ground in the wet mills, washed and dried in accordance with the customary practice the finished product is within the alkalinity range necessary for insuring ease of incorporation in the usual paint vehicles. If due care has not been exercised in drying the alkaline crude lithopone, and if the crude lithopone after drying fails to meet the plant test (hereinafter described) with phenolphthalein, the dried crude lithopone may be wet down to the necessary extent with dilute barium sulfide solution or preferably with a solution of barium-hydrate ($Ba(OH)_2$), and the necessary alkalinity restored in this manner before charging the crude lithopone into the muffling retorts.

As a final corrective, in case the finished product fails to conform to the hereinbefore described alkalinity test for the finished lithopone, a few hundredths of a per cent of an alkaline material, such, for example, as magnesium oxide, barium hydrate, sodium carbonate, sodium bicarbonate, calcium oxide or hydrate, may be added to the wet mills or in the final mixing tanks, where the slight variability between different batches is in practice eliminated. Thus, for example, we have added fifty pounds per day of magnesium oxide in small lots of approximately one pound per wet mill of 5000 pounds capacity in the production of 75 tons of finished material per day.

If the plant control should inadvertently permit a batch of lithopone to arrive at the wet mills or final mixing tanks with alkalinity in excess of the specified limits, such excess can be reduced to the limits required by the addition of a quantitatively determined amount of acid; sulphuric acid is the preferred reagent for this purpose.

In commercial practice, the control of the alkalinity of the finished lithopone, in accordance with the principles of the invention, can be satisfactorily accomplished by simple plant tests which are standardized by the hereinbefore described precision alkalinity test. Thus, samples of the plant output are periodically compared with standard samples representing the upper and lower limits of alkalinity as determined by the hereinbefore described precision alkalinity test. The standard samples, which represent the upper and lower limits of alkalinity of the lithopone, are compared with control samples, that is, appropriate samples taken from the plant output, in the following simple colorimetric manner. Five grams of the control sample and five grams of each of the standard samples are weighed into separate test tubes five-eighths inch in diameter. Twenty-five cubic centimeters of distilled water and five to ten drops of phenolphthalein indicator are added to each test tube. The temperature of the water should be between 65 and 70° F. The contents of each test tube is thoroughly agitated by shaking and then allowed to settle. The colorimetric comparison is made as soon as the lithopone has settled in the test tubes to a sufficient extent to give about two inches of clear pink solution. The indicator is made up by dissolving five grams of phenolphthalein in one liter of C. P. 95% ethyl alcohol. If the alkalinity of the control sample is within the standardized limits, and that is within the range of alkalinity contemplated by the invention, the solution in the test tube containing the control sample will be of a color or tint between the colors or tints of the two limiting standard samples.

It will, of course, be understood by those skilled in the art that the required range of alkalinity in the finished lithopone contemplated by the present invention may be secured in other ways than by maintaining an appropriate excess of barium sulfide in the precipitating liquors. As hereinbefore mentioned, this procedure for producing the contemplated range of alkalinity is especially advantageous when the crude lithopone is uniformly muffled in upright or vertical retorts without access of air, since by such muffling it is easily possible to maintain during the drying and muffling operations the necessary degree of alkalinity for insuring such alkalinity in the finished lithopone as is contemplated by our invention.

Lithopone muffled in upright or vertical retorts in the manner hereinbefore described is practically non-reactive to ultra violet light. The advantages and explanation of this property of inactivity to ultra violet light in lithopone is discussed at length in the patent of James A. Singmaster, Frank G. Breyer and Clayton W. Farber, No. 1,411,648, dated April 4, 1922, and inasmuch as this property of itself forms no part of the present invention a further discussion of the subject is here unnecessary. With respect to the present invention, however, the inactivity of lithopone to ultra violet light, with the consequent high resistance to sunlight of the lithopone, combined with the ease with which the improved lithopone of the present invention incorporates with or is wetted by a paint vehicle such as oil or varnish result in the production of a more satisfactory lithopone for paint purposes than has heretofore been known.

Although the preferred practice of the invention involves muffling the lithopone in upright or vertical retorts without access of air, it is to be understood that the principles of the invention are just as applicable to lithopone muffled in other ways. It is also to be understood that when the lithopone is muffled in such other ways that the alkalinity in the finished lithopone may be produced in any appropriate manner. Thus, the desired alkalinity may be secured by an excess of barium sulfide or other appropriate alkaline substance in the precipitating liquors, although it is to be understood that there is difficulty in carrying through the alkalinity to the final finished product where the lithopone is not muffled in upright retorts without access of air. The required range of alkalinity contemplated by the invention may, if desired, be secured, in whole or in part, by the addition of any appropriate stage in the process of manufacture, such, for example, as to the wet mills, of an appropriate alkaline substance such as barium hydrate, barium sulfide, calcium oxide or hydrate, sodium carbonate, sodium bicarbonate or magnesium oxide or hydrates. In any case the final aim to be attained is a lithopone of such a degree of alkalinity as is within the limits stated in the hereinbefore described precision alkalinity test.

We claim:

1. In the manufacture of lithopone, controlling the ease with which the lithopone mixes with a vehicle such as oil or varnish and the consistency of the resulting mixture by incorporating in the lithopone an alkaline substance in such quantity that the final product when subjected to a precision alkalinity test with methyl orange as an indicator requires between 2 and 4 cubic centimeters of $N/50$ sulfuric acid for titration to a faint pink color of 100 cubic centimeters of a clear filtrate obtained from a mixture of a 50 gram sample of said final product with 250 cubic centimeters of distilled water agitated for 5 minutes at a temperature between 65–75° F.

2. In the manufacture of lithopone, controlling the ease with which the lithopone mixes with a vehicle such as oil or varnish and the consistency of the resulting mixture by precipitating the crude lithopone in the presence of such an excess of an appropriate alkaline substance that after muffling the final product when subjected to a precision alkalinity test with methyl orange as an indicator requires between 2 and 4 cubic centimeters of N/50 sulfuric acid for titration to a faint pink color of 100 cubic centimeters of a clear filtrate obtained from a mixture of a 50 gram sample of said final product with 250 cubic centimeters of distilled water agitated for 5 minutes at a temperature between 65–75° F.

3. In the manufacture of lithopone, controlling the ease with which the lithopone mixes with a vehicle such as oil or varnish and the consistency of the resulting mixture by precipitating the crude lithopone in the presence of such an excess of barium sulfide that after muffling the final product when subjected to a precision alkalinity test with methyl orange as an indicator requires between 2 and 4 cubic centimeters of N/50 sulfuric acid for titration to a faint pink color of 100 cubic centimeters of a clear filtrate obtained from a mixture of a 50 gram sample of said final product with 250 cubic centimeters of distilled water agitated for 5 mintues at a temperature between 65–75° F.

4. In the manufacture of lithopone, controlling the ease with which the lithopone mixes with a vehicle such as oil or varnish and the consistency of the resulting mixture by precipitating the crude lithopone in the presence of such an excess of an appropriate alkaline substance that after appropriate muffling for the production of a final product which is practically non-reactive to ultra-violet light such final product when subjected to a precision alkalinity test with methyl orange as an indicator requires between 2 and 4 cubic centimeters of N/50 sulfuric acid for titration to a faint pink color of 100 cubic centimeters of a clear filtrate obtained from a mixture of a 50 gram sample of said final product with 250 cubic centimeters of distilled water agitated for 5 minutes at a temperature between 65–75° F.

5. In the manufacture of lithopone, controlling the ease with which the lithopone mixes with a vehicle such as oil or varnish and the consistency of the resulting mixture by precipitating the crude lithopone in the presence of such an excess of barium sulfide that after appropriate muffling for the production of a final product which is practically non-reactive to ultra violet light such final product when subjected to a precision alkalinity test with methyl orange as an indicator requires between 2 and 4 cubic centimeters of N/50 sulfuric acid for titration to a faint pink color of 100 cubic centimeters of a clear filtrate obtained from a mixture of a 50 gram sample of said final product with 250 cubic centimeters of distilled water agitated for 5 minutes at a temperature between 65–75° F.

6. In the manufacture of lithopone, controlling the ease with which the lithopone mixes with a vehicle such as oil or varnish and the consistency of the resulting mixture by controlling the alkalinity of the lithopone in the course of its manufacture so that the final product when subjected to a precision alkalinity test with methyl orange as an indicator requires between 2 and 4 cubic centimeters of N/50 sulphuric acid for titration to a faint pink color of 100 cubic centimeters of a clear filtrate obtained from a mixture of a 50 gram sample of said final product with 250 cubic centimeters of distilled water agitated for 5 minutes at a temperature between 65–75° F.

7. In the manufacture of lithopone, controlling the ease with which the lithopone mixes with a vehicle such as oil or varnish and the consistency of the resulting mixture by producing and controlling the required alkalinity at any step or steps of the manufacture so that the final product when subjected to a precision alkalinity test with methyl orange as an indicator requires between 2 and 4 cubic centimeters of N/50 sulphuric acid for titration to a faint pink color of 100 cubic centimeters of a clear filtrate obtained from a mixture of a 50 gram sample of said final product with 250 cubic centimeters of distilled water agitated for 5 minutes at a temperature between 65–75° F.

8. As a new article of manufacture, lithopone which when subjected to a precision alkalinity test with methyl orange as an indicator requires between 2 and 4 cubic centimeters of N/50 sulfuric acid for titration to a faint pink color of 100 cubic centimeters of a clear filtrate obtained from a mixture of a 50 gram sample of said lithopone with 250 cubic centimeters of distilled water agitated for 5 minutes at a temperature between 65–75° F.

9. As a new article of manufacture, lithopone which when subjected to a precision alkalinity test with methyl orange as an indicator requires between 3 and 4 cubic centimeters N/50 sulfuric acid for titration to a faint pink color of 100 cubic centimeters of a clear filtrate obtained from a mixture of a 50 gram sample of said lithopone with 250 cubic centimeters of distilled water agitated for 5 minutes at a temperature between 65–75° F.

10. As a new article of manufacture, lithopone which is practically non-reactive to ultra-violet light and which when subjected to a precision alkalinity test with methyl orange as an indicator requires between 2 and 4 cubic centimeters of N/50 sulfuric acid for titration to a faint pink color of 100 cubic centimeters of a clear filtrate obtained from a mixture of a 50 gram sample of said lithopone with 250 cubic centimeters of distilled water agitated for 5 minutes at a temperature between 65–75° F.

11. As a new article of manufacture, lithopone which is practically non-reactive to ultra-violet light and which when subjected to a precision alkalinity test with methyl orange as an indicator requires be- 3 and 4 cubic centimeters of N/50 sulfuric acid for titration to a faint pink color of 100 cubic centimeters of a clear filtrate obtained from a mixture of a 50 gram sample of said lithopone with 250 cubic centimeters of distilled water agitated for 5 minutes at a temperature between 65–75° F.

In testimony whereof we affix our signatures.

FRANK G. BREYER.
CLAYTON W. FARBER.